Aug. 7, 1928.
J. C. SELL
1,679,381
TRACTOR WHEEL CLAMP
Filed June 22, 1927
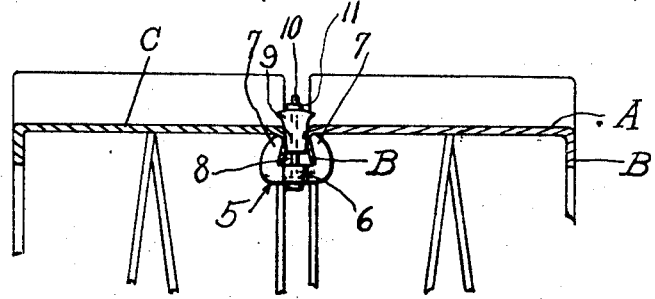
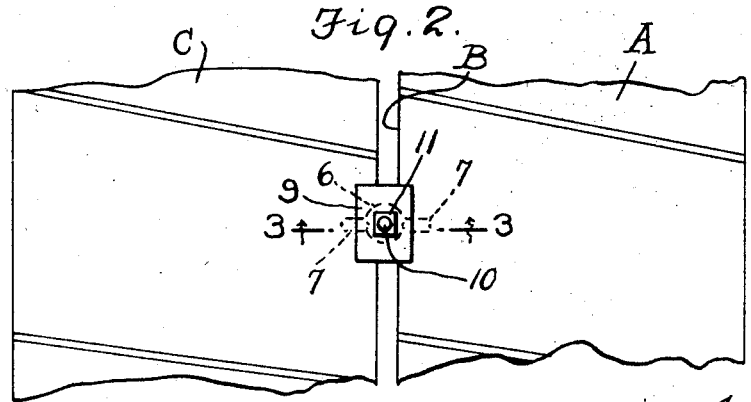
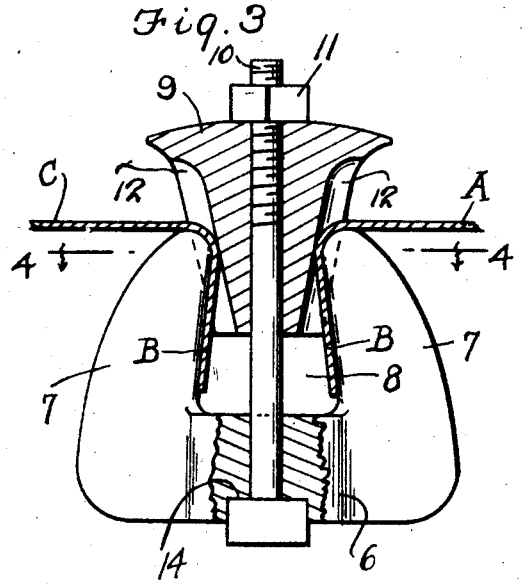
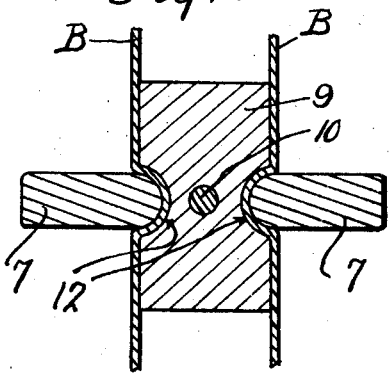
INVENTOR.
J. C. Sell
BY L. B. James
ATTORNEY.

Patented Aug. 7, 1928.

1,679,381

UNITED STATES PATENT OFFICE.

JOHANN CONRAD SELL, OF DETROIT, MICHIGAN.

TRACTOR WHEEL CLAMP.

Application filed June 22, 1927. Serial No. 200,682.

This invention relates to tractors and more particularly to clamps for securing auxiliary traction wheels to the sides of the main traction wheels thereof.

The primary object of this invention resides in the provision of a series of clamps adapted to secure auxiliary traction wheels beside the main traction wheels of tractors so as to establish rigidity therebetween.

Another object of this invention resides in the provision of a series of clamps adapted to be engaged with the flanges of the treads of associated traction and auxiliary wheels so as to eliminate circumferential movement between the wheels during heavy driving.

A further object of this invention resides in the provision of a series of clamps adapted to crimp the opposed inturned flanges of associated traction and auxiliary wheels, therebetween so as to prevent displacement of one to the other.

A still further object of this invention resides in the provision of a series of clamps consisting of an association of coacting elements adapted to secure an auxiliary traction wheel to each of the main traction wheels of a tractor so undue circumferential stress on the auxiliary traction wheel will not cause it to twist out of true with the main traction wheel.

In addition to the foregoing objects this invention resides in the particular construction of the clamps and especially the association of the arms of the female members with the grooves in the wedges.

Aside from the foresaid objects this invention resides in the particular association of the bolt with the female member.

With these and other objects in view, this invention resides in certain novel features of construction, arrangement and combination of parts to be hereinafter set forth in the specification, illustrated in the accompanying drawings and pointed out in the appended claims and, while the disclosure depicts my present conception of the invention, the right is reserved to make such changes in construction as come within the scope of the claims.

In the accompanying drawing forming a part of this application:

Fig. 1 is a cross sectional view through a portion of a tractor wheel showing the elements of this invention securing an auxiliary traction wheel to the side thereof.

Fig. 2 is an enlarged plan view thereof.

Fig. 3 is sectional view on line 3—3 of Fig. 2.

Fig. 4 is a similar view on line 4—4 of Fig. 3.

In the present embodiment of this invention the letter A designates one of the main traction wheels of a tractor or other piece of similar machinery, the same being herein shown as having inturned flanges B directed from its tread, while C designates an auxiliary traction wheel similarly constructed and adapted to be disposed against one side of the main traction wheel to increase the tread area of the wheel and, of course, it is to be understood that traction lugs, flanges or the like can either be secured to the aforesaid treads or omitted as the occasion requires.

The clamps comprising this invention, each consists of a female member 5 having an apertured base 6 from which extend arms 7 forming a fork-like structure so as to provide a substantially inverted U-shaped slot 8 between the arms for the reception of opposed inturned flanges of the main and auxiliary traction wheels. Each of the aforesaid members is adapted to straddle the inturned flanges of the main and auxiliary wheels after which an apertured wedge 9 is inserted between the flanges from the periphery of the wheels and a bolt 10 passed through the aforesaid apertures of said elements, whereupon a nut 11 is screwed on the bolt from the peripheral side of the wheels to cause the wedge to spread that area of the flanges disposed between the arms 7 of the female member and grooves 12 in the wedge, thus it is apparent that as the wedge is drawn within the substantially inverted U-shaped slot of the female member, by the bolt and nut, the inturned flanges of the wheels will be caused to seat in the grooves and, since the arms 7 likewise tend to seat in the grooves over the areas of the flanges thus deflected, such association prevents circumferential movement between the wheels so secured together.

In order to prevent the bolt from turning, while the nut is manipulated, the base 6 is provided with a depression 14 for the reception of the bolt head.

With this invention fully set forth it is manifest that means are provided whereby the main and auxiliary wheels of tractors will be rigidly secured side by side and, through the particular construction of the coacting elements, the manufacture will be simple and inexpensive.

Having thus described my invention what I claim and desire to protect by Letters Patent is:

1. A clamp of the character described comprising a female member having a substantially inverted U-shaped slot therein and an aperture communicating with the slot, an apertured wedge having grooves opposed to the walls of the slot in the female member, a bolt extending through the apertures of the female member and wedge, and a nut on the bolt.

2. A clamp of the character set forth comprising a wedge having grooves in certain walls thereof and an aperture therethrough, a female member having an aperture in alignment with that in the wedge, arms carried by the female member in opposed relation to the grooves in the wedge, a bolt extending through the apertures in the female member and wedge, and a nut engaged on the bolt and bearing against the wedge.

In testimony whereof I affix my signature.

JOHANN CONRAD SELL.